United States Patent
Fujita et al.

(10) Patent No.: US 11,827,287 B2
(45) Date of Patent: Nov. 28, 2023

(54) STEERING ANGLE RESTRICTING DEVICE (71) Applicant: Hitachi Astemo, Ltd., Hitachinaka (JP)

(72) Inventors: Hiroshi Fujita, Tochigi (JP); Shun Saito, Tochigi (JP)

(73) Assignee: HITACHI ASTEMO, LTD., Hitachinaka (JP)

(*) Notice: Subject to any disclaimer, the term of this patent is extended or adjusted under 35 U.S.C. 154(b) by 608 days.

(21) Appl. No.: 17/052,956

(22) PCT Filed: Jun. 12, 2018

(86) PCT No.: PCT/JP2018/022410
§ 371 (c)(1),
(2) Date: Nov. 4, 2020

(87) PCT Pub. No.: WO2019/239482
PCT Pub. Date: Dec. 19, 2019

(65) Prior Publication Data
US 2021/0237793 A1  Aug. 5, 2021

(51) Int. Cl.
*B62D 5/00* (2006.01)
*B62D 1/04* (2006.01)
*B62D 1/16* (2006.01)
*B62D 5/04* (2006.01)

(52) U.S. Cl.
CPC .............. *B62D 5/001* (2013.01); *B62D 1/04* (2013.01); *B62D 1/16* (2013.01); *B62D 5/0454* (2013.01)

(58) Field of Classification Search
CPC .................................................... B62D 5/001
See application file for complete search history.

(56) References Cited

U.S. PATENT DOCUMENTS

2006/0042411 A1* 3/2006 Abele ............... B62D 15/0225
74/29

FOREIGN PATENT DOCUMENTS

JP     10-194152     7/1998

OTHER PUBLICATIONS

International Search Report, dated Aug. 14, 2018, 1 page.

* cited by examiner

*Primary Examiner* — Kevin Hurley
(74) *Attorney, Agent, or Firm* — Rankin, Hill & Clark LLP (57) ABSTRACT

A steering angle restricting device includes an input shaft that is rotated when a steering wheel is turned, a first member that includes a first base which surrounds the input shaft and is capable of rotating together with the input shaft, and a first protrusion that protrudes in the radial direction or in the axial direction from the first base, a second member that includes a second base that surrounds the first base, and a second protrusion that protrudes from the second base and on the trajectory of the first protrusion. The second member is capable of rotating together with the first member only in the state in which the first protrusion is abutting the second protrusion, and a stopper that is provided on the trajectory of the second protrusion and is capable of restricting the turning of the steering wheel via the input shaft when the second protrusion abuts.

19 Claims, 8 Drawing Sheets

STEERING ANGLE RESTRICTING DEVICE

TECHNICAL FIELD

The present disclosure relates to a steering angle restricting device that restricts a turnable angle of a steering wheel.

BACKGROUND ART

Regarding steering devices for vehicles, etc., a steer by wire (steer-by-wire) system has been known which has an input shaft rotatable together with a steering wheel and disengaged from turn wheels. Various steering angle restricting devices which are provided on such a steering device, and which restrict a turnable angle of the steering wheel have been proposed. A technology as such a steering angle restricting device is disclosed in, for example, the following Patent Document 1.

The steering angle restricting device disclosed in Patent Document 1 includes an input shaft that is rotated by turning a steering wheel, a slit member which is provided so as to spin around relative to the input shaft and which has an elongated hole opened along the circumference direction of the input shaft, a pin which passes completely through the elongated holed of the slit member, and which has a tip fitted in the input shaft, and a stopper formed so as to be able to abut the slit member.

When a driver turns the steering wheel, the pin rotates together with the input shaft. The slit member does not rotate while the pin is moving within the elongated hole. Moreover, when the steering wheel is further turned, the pin moves to the edge of the elongated hole and abuts the slit member. When the steering wheel is further turned, the slit member pushed by the pin also rotates. When the steering wheel is turned by a predetermined amount, a part of the slit member abuts the stopper, and thus the rotation thereof is restricted.

The steering angle restricting device restricts the turnable angle of the steering wheel by the length of the elongated hole and by the position of the stopper.

CITATION LIST

Patent Literatures

[Patent document 1] JP H10-194152A

SUMMARY OF INVENTION

Technical Problem

When the steering angle restricting device disclosed in Patent Document 1 is to be assembled, first, the slit member is fitted to the input shaft, and the pin is inserted to the input shaft through the elongated hole. A worker needs to hold the slit member so as not to rotate with the elongated hole being overlapped with the position where the pin of the input shaft is inserted.

An objective of the present disclosure is to provide a steering angle restricting device that facilitates assembling thereof.

Solution to Problem

There is provided, according to the present disclosure, a steering angle restricting device that includes:

a first member that includes a first base which surrounds an input shaft that is rotated when a steering wheel is turned, and which is capable of rotating together with the input shaft, and a first protrusion which protrudes in a radial direction or in an axial direction from the first base;

a second member that includes a second base which surrounds the first base, and a second protrusion which protrudes from the second base and on a trajectory of the first protrusion, the second member being capable of rotating together with the first member only in a state in which the first protrusion is abutting the second protrusion; and a stopper which is provided on a trajectory of the second protrusion, and which is capable of restricting the turning of the steering wheel via the input shaft when the second protrusion abuts.

Advantageous Effects of Invention

According to the present disclosure, the steering angle restricting device includes the first member that has the first base surrounding the input shaft, and the second member surrounding the first base of the first member. The second member can be laid over on the first member along the axial direction of the input shaft. Assembling can be carried out by causing the two members to be overlapped with each other along the axial line. Hence, the steering angle restricting device that facilitates assembling thereof is provided.

DESCRIPTION OF EMBODIMENTS

Embodiments to carry out the present disclosure will be described below with reference to the accompanying figures. Note that in the following description, the terms right and left mean the right and left sides with reference to a person in a vehicle, and the terms front and rear mean the front and rear sides with reference to the travelling direction of the vehicle.

First Embodiment

Figure 1:
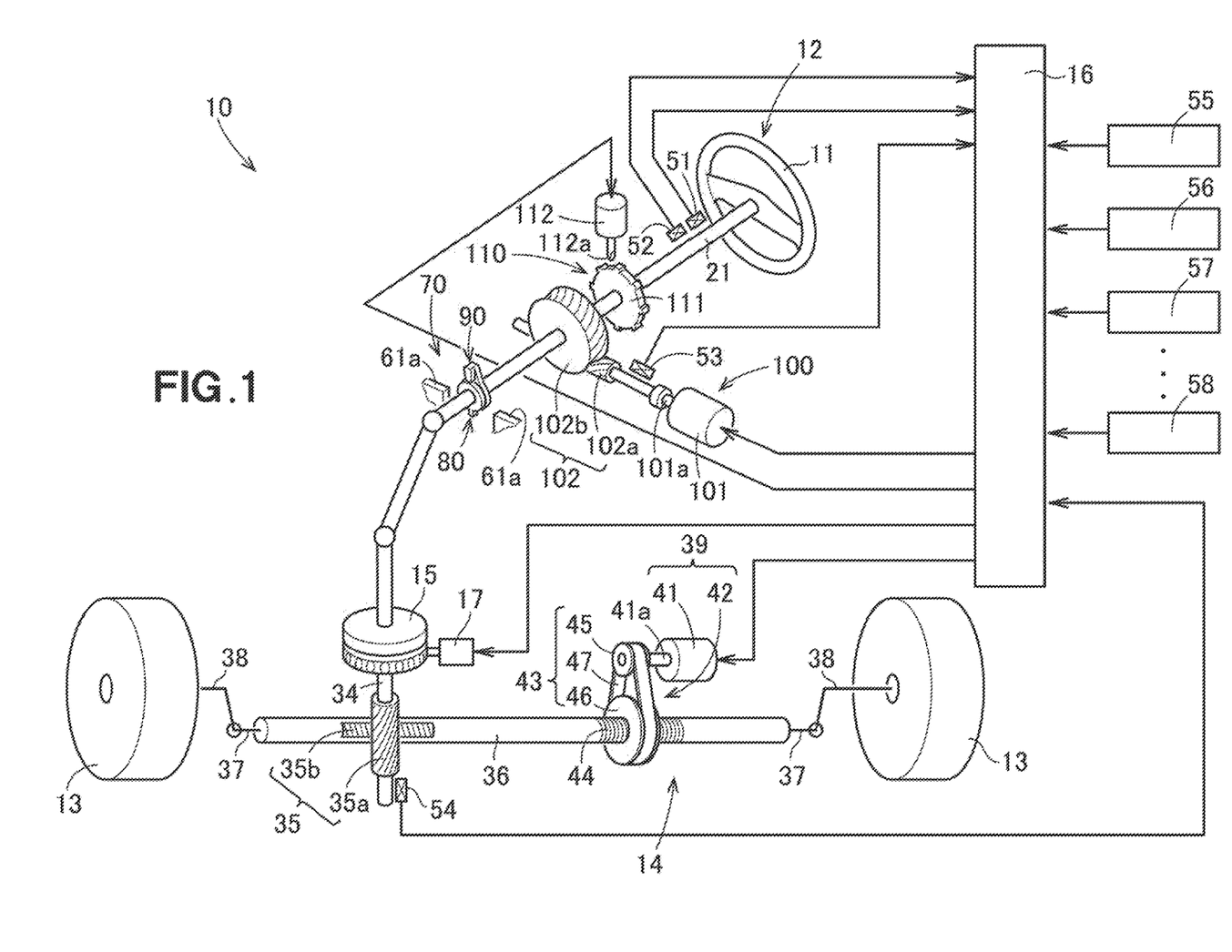
FIG. 1 is a diagram exemplarily illustrating a steering device built with a steering angle restricting device according to a first embodiment of the present disclosure.

With reference to FIG. 1, a steering angle restricting device 70 according to a first embodiment is built in, for example, a vehicular steering device 10. The vehicular steering device 10 includes a steering unit 12 where a steering input through a vehicular steering wheel 11 is caused, a turning unit 14 that turns right and left turn wheels 13 and 13, a clutch 15 present between the steering unit 12 and the turning unit 14, and a control unit 16.

In a normal condition, the clutch 15 is in an unlatched state, and the steering unit 12 and the turning unit 14 are mechanically separated from each other. That is, in a normal condition, respective ends of the steering unit 12 and of the turning unit 14 are disengaged from each other. The vehicular steering device 10 employs a scheme so-called a steer by wire (steer-by-wire, an "SBW" as an abbreviated expression) scheme that turns the right and left turn wheels 13 and 13 by actuating a turn actuator 39 in accordance with the steered amount of the steering wheel 11.

In an emergency condition, a changer 17 that has received an electrical signal from the control unit 16 is actuated, and causes the clutch 15 to be latched. This causes the steering unit 12 and the turning unit 14 to be mechanically connected with each other.

The steering unit 12 includes the steering wheel 11 to be operated by a driver, and an input shaft 21 that is coupled to the steering wheel 11.

Provided on the input shaft 21 is the steering angle restricting device 70 that restricts a turnable angle of the steering wheel. The steering angle restricting device 70 will be described below in detail.

The turning unit 14 includes an output shaft 34 coupled to the input shaft 21 via the clutch 15, a turn shaft 36 coupled to the output shaft 34 via an operation-force transmission mechanism 35, right and left tie rods 37 and 37 provided at respective ends of the turn shaft 36, right and left king pins 38 and 38 connected to the right and left turn wheels 13 and 13, respectively, via the respective right and left tie rods 37 and 37, and the turn actuator 39 that applies turn force to the turn shaft 36.

The operation-force transmission mechanism 35 is, for example, a rack and pinion mechanism. The rack and pinion mechanism 35 (the operation-force transmission mechanism 35) includes a pinion 35a provided on the output shaft 34, and a rack 35b provided on the turn shaft 36. The turn shaft 36 is movable in the axial direction (a vehicle widthwise direction).

The turn actuator 39 includes a turn-force motor 41 that produces the turn force, and a turn-force transmission mechanism 42 that transmits turn force to the turn shaft 36. The turn force produced by the turn-force motor 41 is transmitted to the turn shaft 36 by the turn-force transmission mechanism 42. Consequently, the turn shaft 36 slides in the vehicle widthwise direction. The turn-force motor 41 is, for example, an electric motor.

The turn-force transmission mechanism 42 includes, for example, a belt drive mechanism 43, and a ball screw 44. The belt drive mechanism 43 includes a driven pulley 45 provided at a motor shaft 41a of the turn-force motor 41, a follower pulley 46 provided at the nut of the ball screw 44, and a belt 47 tensioned between the driven pulley 45 and the follower pulley 46.

The ball screw 44 is a kind of conversion mechanisms that convert rotational motion into linear motion, and transmits the drive force produced by the turn-force motor 41 to the turn shaft 36. Note that the turn-force transmission mechanism 42 is not limited to a structure that employs the belt drive mechanism 43 and the ball screw 44, and may employ, for example, a worm gear mechanism or a rack and pinion mechanism.

The control unit 16 receives respective detection signals from a steering angle sensor 51, a steering torque sensor 52, a motor rotation angle sensor 53, an output shaft rotation angle sensor 54, a vehicle speed sensor 55, a yaw rate sensor 56, an acceleration sensor 57, and other various sensors 58, and applies, in response to the received detection signal, a current to the clutch 15, the changer 17, the turn-force motor 41, and reactive-force motor 101 and stopper main body 112 both described in detail later.

The steering angle sensor 51 detects the steering angle of the steering wheel 11. The steering torque sensor 52 detects steering torque produced on the input shaft 21. The motor rotation angle sensor 53 detects the rotation angle of the reactive-force motor 101. The output shaft rotation angle sensor 54 detects the rotation angle of the output shaft 34 that has the pinion 35a. The vehicle speed sensor 55 detects the running speed of the vehicle. The yaw rate sensor 56 detects a yaw angular speed (the angular speed of yaw motion). The acceleration sensor 57 detects the acceleration of the vehicle. The other various sensors 58 include a rotation angle sensor that detects the rotation angle of the turn-force motor 41. The rotation angle sensor is formed by, for example, a resolver provided on the turn-force motor 41.

Figure 2:
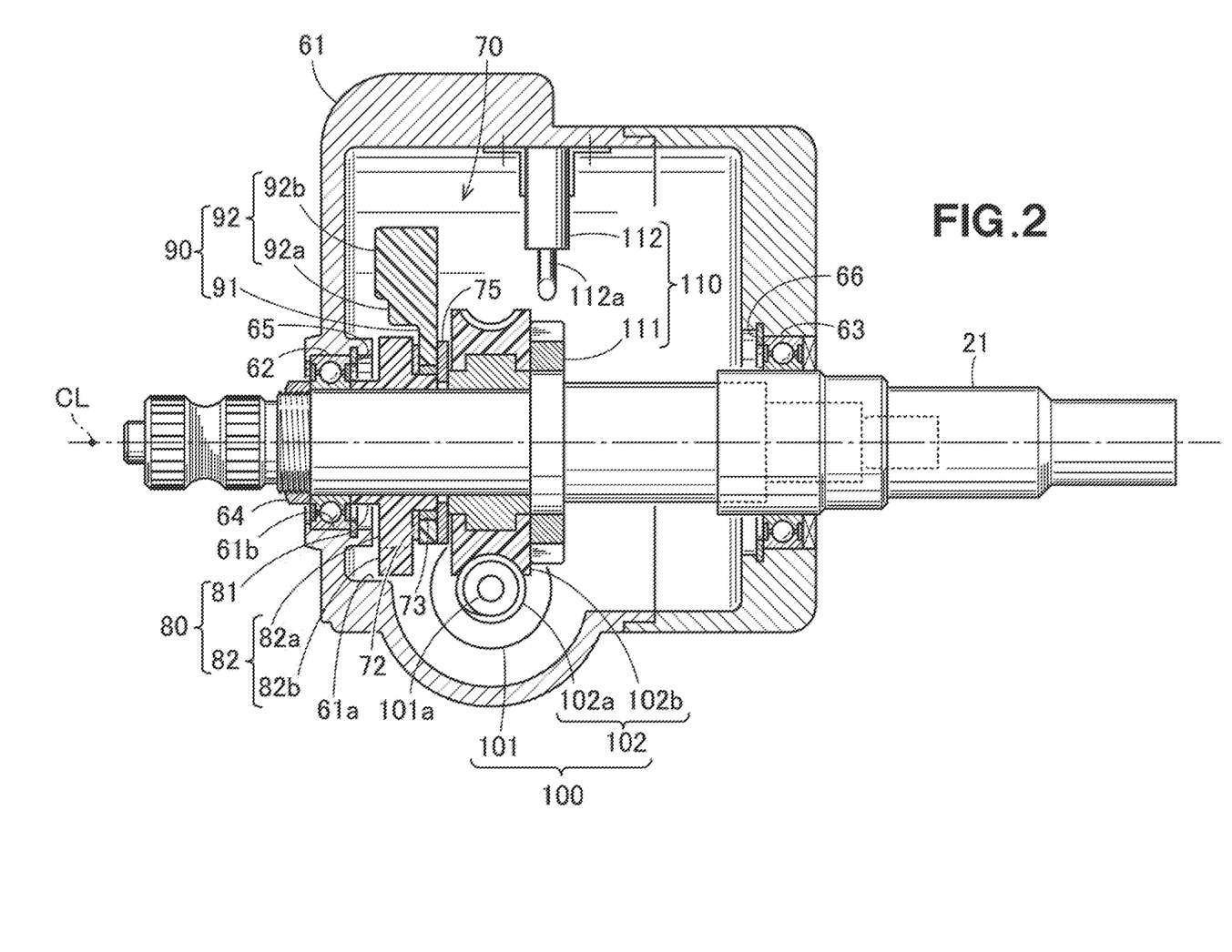
FIG. 2 is a cross-sectional view of the steering angle restricting device illustrated in FIG. 1.

FIG. 2 illustrates a cross-sectional structure around the input shaft 21. The input shaft 21 passes completely through a housing 61, and is supported by the housing 61 so as to be freely rotatable via ball bearings 62 and 63. The steering angle restricting device 70 is held in the housing 61. The housing 61 is provided with a housing recess 61b that prevents the ball bearing 62 from being detached in the downward direction in FIG. 2.

The housing 61 can be formed of arbitrary materials.

The nut 64 is fastened to the input shaft 21. The nut 64 is capable of abutting the inner race of the ball bearing 62, and restricts the movement of the input shaft 21 in the right direction in the figure.

The ball bearings 62 and 63 are prevented from being detached from the housing 61 by C-rings 65 and 66, respectively, formed in the letter C-shape.

Figure 3:
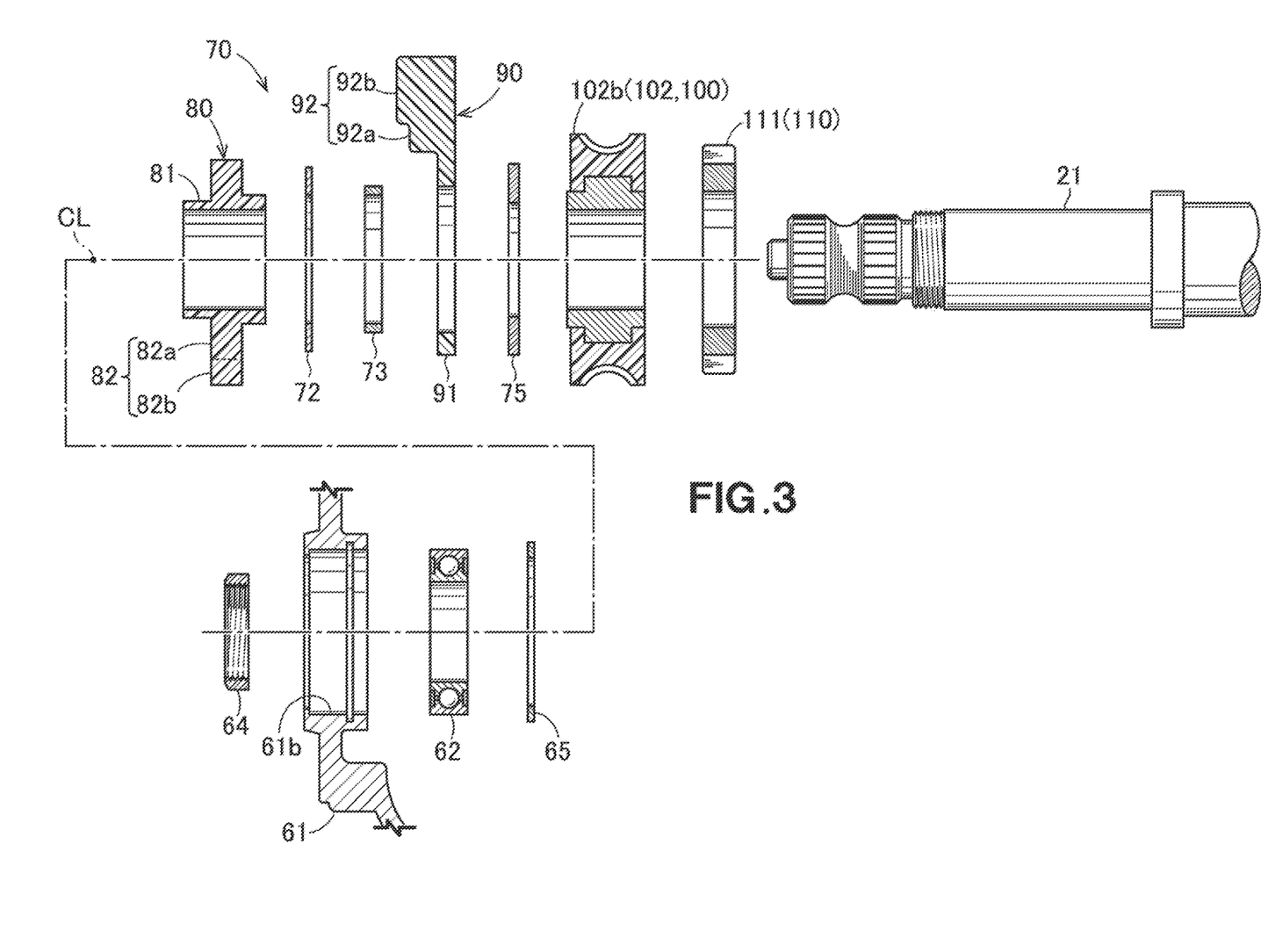
FIG. 3 is an exploded view of the steering angle restricting device illustrated in FIG. 2.

With reference to also FIG. 3, the steering angle restricting device 70 includes a first member 80 which is fastened to the input shaft 21 and which is rotatable together with the input shaft 21, first and second bearing 72 and 73 which are provided on the outer circumference of the first member 80 and which are each formed of a metal ring, a second member 90 placed on the outer circumference of the first member 80 via the first and second bearing 72 and 73, a stopper 61a which is provided on the trajectory of the second member 90 and which is formed by a part of the housing 61, a third bearing 75 formed by a metal ring capable of abutting the first member 80 and the second member 90, a reactive-force applying mechanism 100 which is located adjacent to the third bearing 75 and which applies torque in the opposite direction to the rotation of the input shaft 21, and an arbitrary angle stopper 110 which is located adjacent to the reactive-force applying mechanism 100 and which stops the rotation of the input shaft 21 at an arbitrary angle.

Figure 4:
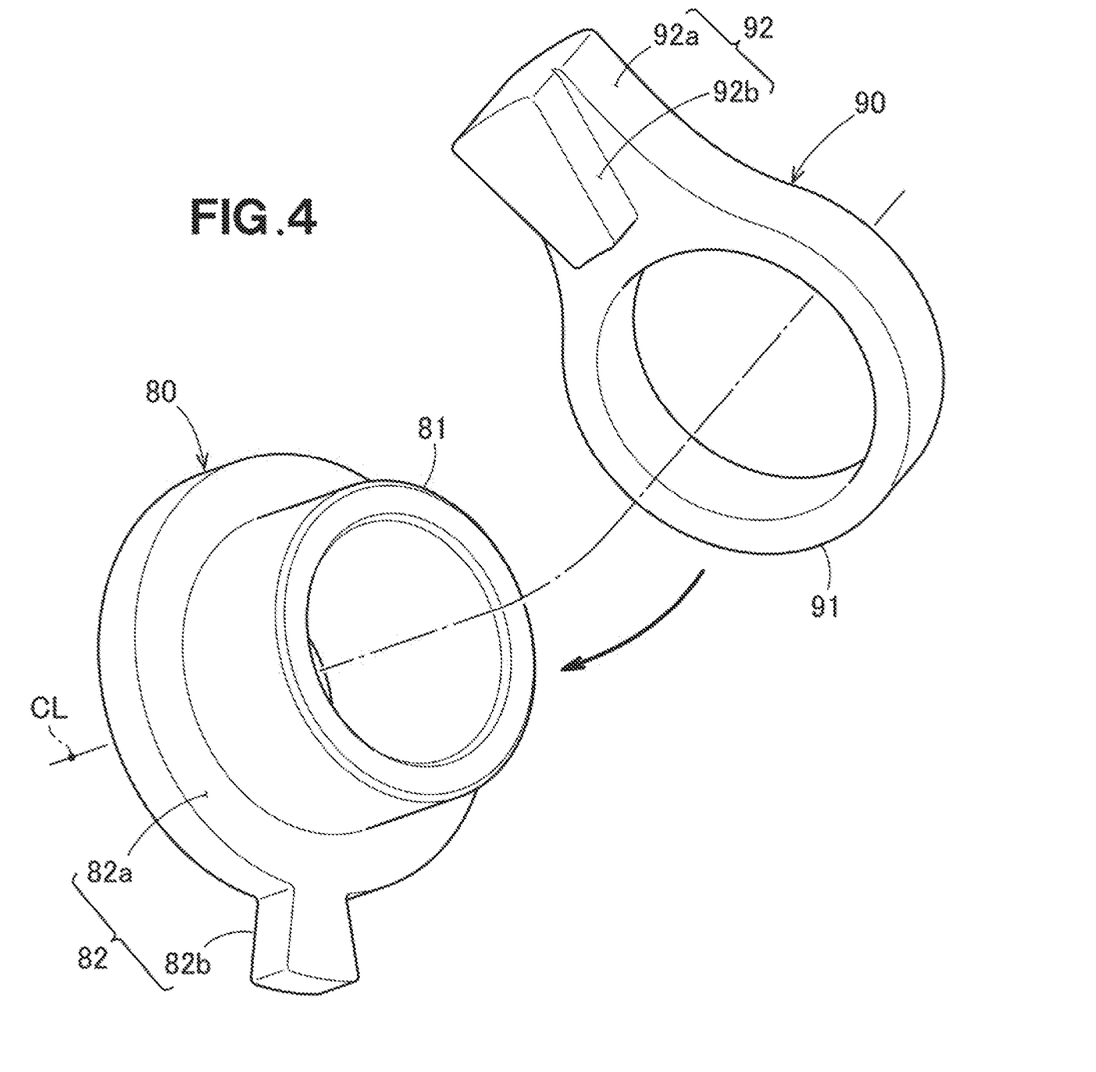
FIG. 4 is an exploded perspective view of a first member and of a second member both illustrated in FIG. 2.

With reference to FIG. 2 and to FIG. 4 the first member 80 includes a first base 81 which is fastened to the input shaft 21 and which is rotatable together with such an input shaft, and a first protrusion 82 that protrudes in the radial direction from the first base 81. Regarding the material of the first member 80, an arbitrary material like a high rigidity material, such as metal or ceramic, or an elastic material, such as a rubber or an elastic resin, is selectable.

With the steering angle restricting device 70 being formed, and one end of the other member that can be displaced in the axial direction along the input shaft 21 being abutting another component that cannot be displaced in the axial direction, one end of the first base 81 parallel to a rotation axis CL of the first member 80 in the axial direction may be configured to abut the other end of such a component.

Moreover, when two other components which are located at respective ends in the axial direction parallel to the rotation axis CL of the first member 80, and which form the steering angle restricting device 70 can be displaced in the axial direction along the input shaft 21, the maximum apart distance between such two other components and the length of the first base 82 in the axial direction may be designed so as to be consistent with each other.

Such a structure disables the other members 62 and 75 to be displaced in the axial direction, eliminating the necessity of a component dedicated for suppressing a backlash and a detachment. Hence, reduction in number of components, etc., can be accomplished. This is advantageous in view of costs, etc. In other words, the first base 81 also serves as a positioning member for the other member that forms the steering angle restricting device 70.

For example, as illustrated in FIG. 2, a structure is employed in which, with the lower end of the ball bearing 62 abutting the housing recess 61*b*, the lower end of the first base 81 in the axial direction parallel to the rotation axis of the first member 80 in the figure abuts the upper end of the ball bearing 62. This disables the ball bearing 62 to be displaced in the axial direction, and thus a backlash and a detachment can be suppressed.

Moreover, as illustrated in FIG. 2, for example, a structure is employed in which, with the upper end of the third bearing 75 abutting the worm 102*a* press-fitted and fastened to the input shaft, the upper end of the first base 81 in the axial direction parallel to the rotation axis of the first member 80 in the figure abuts the lower end of the third bearing 75. This disables the third bearing 75 to be displaced in the axial direction, and thus a backlash of the third bearing 75 can be suppressed. This enables the third bearing 75 to have a large dimensional tolerance in inner diameter relative to the outer diameter of the input shaft 21.

The first protrusion 82 may further include an annular portion 82*a* formed annularly along the outer circumference of the first base 81. In this case, the term radial direction means a direction that extends radially around the axial line CL of the input shaft 21.

The annular portion 82*a* is formed along the entire outer circumference of the first base 81. This prevents the first bearing 72, the second bearing 73, and the second member 90 from being detached and from having a backlash.

The second member 90 includes a second base 91 in a substantially annular shape surrounding the first base 81, and a second protrusion 92 that protrudes from the second base 91 and on the trajectory of the first protrusion 82. A feature such that the second protrusion 92 is located above the trajectory of the first protrusion 82 will be described later in detail. The second member 90 is located between both ends of the first base 81.

Regarding the material of the second member 90, an arbitrary material, such as a metal, a rubber, or a resin, is selectable.

The second protrusion 92 includes a radial-direction protrusion 92*a* that protrudes in the radial direction from the second base 91, and an axial-direction protrusion 92*b* that protrudes in the direction along the axial line CL from the radial-direction protrusion 92*a*.

Although an abutment portion 82*b* and the axial-direction protrusion 92*b* may be in any shape, it is preferable that those are formed in a substantially trapezoidal shape and to have respective portions corresponding to the inclined sides of the respective trapezoids directed in the same direction so as to ensure a large contact area therebetween.

With reference to FIG. 2, the reactive-force applying mechanism 100 includes a reactive-force motor 101 (a motor 101) through which a current in accordance with the torque by the input shaft 21 is caused to flow, and a reactive-force transmission mechanism 102 that transmits steering reactive force to the input shaft 21.

The reactive-force motor 101 is, for example, an electric motor. The control unit 16 supplies the current to the reactive-force motor 101, and actuates such a motor.

The reactive-force transmission mechanism 102 is a worm gear mechanism. The reactive-force transmission mechanism 102 includes a worm 102*a* provided on a motor shaft 101*a* of the reactive-force motor 101, and a worm wheel 102*b* which is meshed with the worm 102*a*, is provided on the input shaft 21, and rotates together with the rotation of the worm 102*a*. The steering reactive force produced by the reactive-force motor 101 is applied to the input shaft 21 via the reactive-force transmission mechanism 102.

The reactive-force applying mechanism 100 gives a steering feeling to the driver by producing the steering reactive force against the steering force of the steering wheel 11 by the driver.

With reference to also FIG. 1, the arbitrary angle stopper 110 is capable of changing the steering range of the steering wheel 11 (see FIG. 1) as appropriate in accordance with the running state of the vehicle, the state of the steering device. When, for example, the load on the turning unit 14 becomes equal to or greater than a predetermined load that is set in advance (i.e., overload), the arbitrary angle stopper 110 restricts the steering range of the steering wheel 11. More specifically, the turn of the steering wheel 11 is to be restricted.

According to conventional technologies, when the turn wheel 13 is stuck or hits an obstacle like a curbstone, in order to let the driver to perceive such an event, the control unit 16 causes the clutch 15 to be latched, or causes the reactive-force applying mechanism 100 to produce reactive force that disables the driver to turn the steering wheel. Accordingly, since the turning unit 14, the clutch 15, and the reactive-force applying mechanism 100 need to have a strength that can withstand against large load, those components are inevitably become large in size.

In contrast, according to this embodiment, the arbitrary angle stopper 110 that has received the control signal from the control unit 16 restricts the steering range so as to disrupt a turn increase operation on the steering wheel 11. Consequently, a large load is not to be applied to the clutch 15 and to the reactive-force applying mechanism 100. This enables downsizing of the clutch 15 and of the reactive-force applying mechanism 100.

The arbitrary angle stopper 110 includes a locking wheel 111 that rotates together with the input shaft 21, and the stopper main body 112 which is provided so as to be forwardly or backwardly movable relative to the locking wheel 111, and which is capable of contacting the locking wheel 111 by forward movement.

The stopper main body 112 is a solenoid fastened to the housing 61. The stopper main body 112 causes, in response to the electrical signal from the control unit 16, a rod 112*a* to move forwardly toward the locking wheel 111. Contact of the rod 112*a* with the locking wheel 111 restricts the rotation of the input shaft 21.

Next, an example assembling method of the steering angle restricting device will be described.

With reference to FIG. 3, first, the input shaft 21, the first member 80 that includes the first base 81 in a substantially ring shape, the first bearing 72, the second bearing 73, and the second member 90 that includes the second base 91 in a substantially ring shape are prepared (a preparation process).

Next, the first bearing 72 is fitted to the outer circumference of the first base 81 (a first bearing placement process). Next, the second bearing 73 is fitted to the outer circumference of the first base 81 (a second bearing placement process).

Next, the second base 91 is fitted to the outer circumference of the second bearing 73 (a second member placement process). Hence, the second member 90 is placed on the outer circumference of the first base 81. The second member placement process can be also considered as a process of placing the second member 90 on the outer circumference of the first base 81.

The first member 80, the first bearing 72, the second bearing 73, and the second member 90 which are now assembled as a unit is fitted to the input shaft 21 (a two-member placement process). The two-member placement process is performed by moving the first member 80, the first bearing 72, the second bearing 73, and the second member 90 along the axial line CL of the input shaft 21.

Note that the first member 80 and the second member 90 not assembled as a unit in advance may be also placed on the input shaft 21. According to the present disclosure, what is important is to move the first base 81 and the second base 91 in a predetermined sequence along the input shaft 21 and to place those on the outer circumference of the input shaft 21, to place the second base 91 on the outer circumference of the first base 81. Note that the first base 81 and the second base 91 can be fitted to the input shaft 21 from either end thereof.

Next, an action of the present disclosure will be described.

Figure 5A:
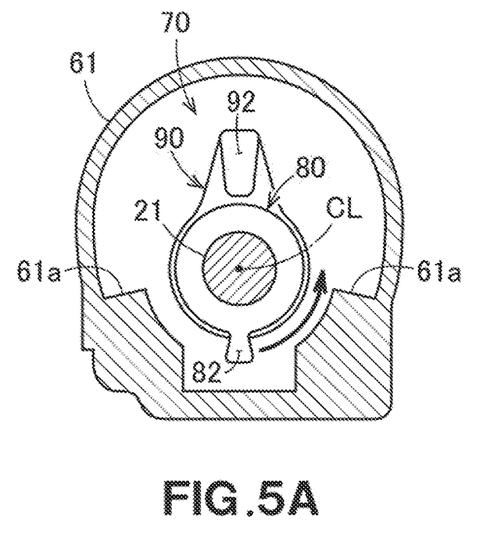
FIGS. 5A to 5D are each a diagram for describing an action of the steering angle restricting device illustrated in FIG. 2.
Figure 5B:
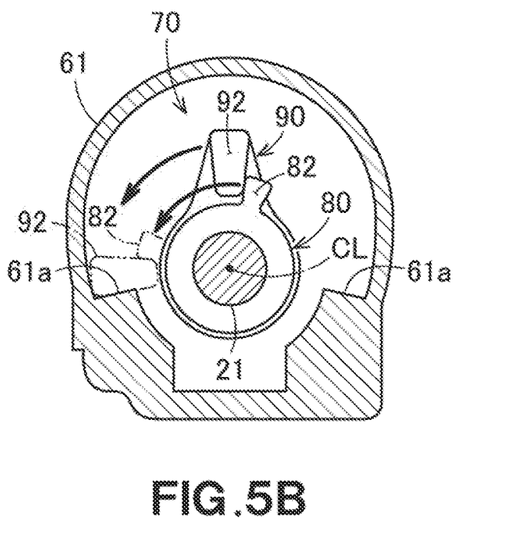
Figure 5C:
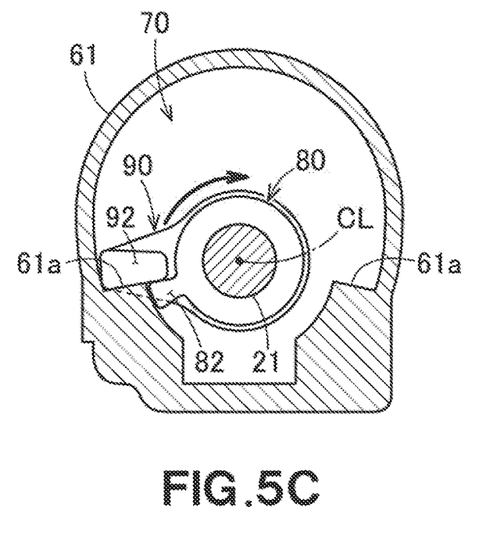
Figure 5D:
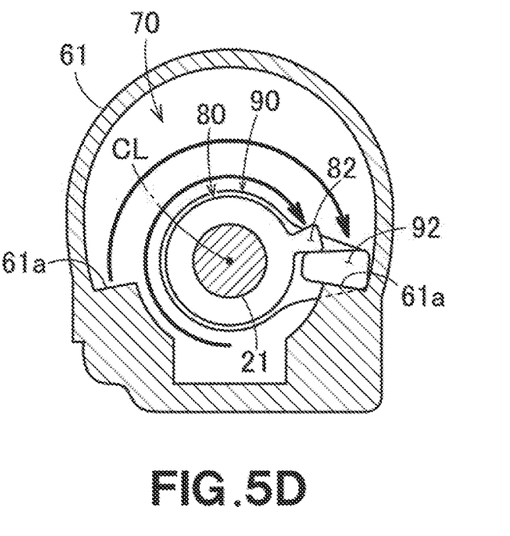

With reference to FIGS. 5A to 5D, FIG. 5A illustrates a state in which the first member rotates with the first protrusion not abutting the second protrusion. FIG. 5B illustrates a state in which the second protrusion contacts the stopper from the state in which the first protrusion abuts the second protrusion. FIG. 5C illustrates a state in which the first member is rotated in the clockwise direction. FIG. 5D illustrates a state in which the first member and the second member rotate in the clockwise direction, and contact the stopper.

With reference to FIG. 5A, when the steering wheel 11 (see FIG. 1) is turned in the counterclockwise direction, the input shaft 21 and the first member 80 are also rotated in the counterclockwise direction. In the state illustrated in the figure, the first protrusion 82 does not abut the second protrusion 92. With the first protrusion 82 not abutting the second protrusion 92, the second member 90 does not rotate. That is, with the first protrusion 82 not abutting the second protrusion 92, the input shaft 21 and the first member 80 rotate without an engagement with the second member 90.

With reference to also FIG. 5B, the second protrusion 92 is placed on the trajectory of the first protrusion 82. Hence, the first protrusion 82 abuts the second protrusion 92 (FIG. 5B) by turning the steering wheel 11 from the state illustrated in FIG. 5A. The second protrusion 92 is pushed by the first protrusion 82 by further turning the steering wheel 11 from this state. Consequently, the second member 90 rotates together with the first member 80.

Further turning the steering wheel 11 causes the second protrusion 92 to contact the stopper 61a (see dotted lines in FIG. 5B). The contact of the second protrusion 92 with the stopper 61a restricts the turning of the steering wheel 11.

With reference to FIG. 5B and FIG. 5C, the steering wheel 11 is turned in the clockwise direction from the state indicated by the dotted lines in FIG. 5B. This causes the first protrusion 82 to become apart from the second protrusion 92, and allows only the first member 80 to rotate. By continuously turning the steering wheel 11, as illustrated in FIG. 5C, the first protrusion 82 abuts the second protrusion 92 from the lower part thereof.

With reference to FIG. 5C and FIG. 5D, when the steering wheel 11 is further turned, the second protrusion 92 is pushed by the first protrusion 82. Consequently, the second member 90 rotates together with the first member 80.

Further turning the steering wheel 11 causes the second protrusion 92 to contact the stopper 61a (see FIG. 5D). The contact of the second protrusion 92 with the stopper 61a restricts the turning of the steering wheel 11.

The second member 90 is capable of rotating together with the first member 80 only in the state in which the first protrusion 82 is abutting the second protrusion 92.

The present disclosure as described above can be summarized as follows.

With reference to FIG. 2, the steering angle restricting device 70 includes: the first member 80 that includes the first base 81 which surrounds the input shaft 21 that is rotated when the steering wheel 11 is turned, and which is capable of rotating together with the input shaft, and the first protrusion 82 which protrudes in the radial direction (or in the axial direction) from the first base 81; and the second member 90 that includes the second base 91 which surrounds the first base 81, and the second protrusion 92 which protrudes from the second base 91 and on the trajectory of the first protrusion 82. This second member is capable of rotating together with the first member 80 only in the state in which the first protrusion 82 is abutting the second protrusion 92.

With reference to FIG. 5A, the steering angle restricting device 70 further includes the stopper 61a which is provided on the trajectory of the second protrusion 92, and which is capable of restricting the turning of the steering wheel 11 via the input shaft 21 when the second protrusion abuts.

With reference to FIG. 3, the steering angle restricting device 70 includes: the first member 80 that has the first base 81 surrounding the input shaft 21, and the second member 90 that surrounds the first base 81 of the first member 80. The second member 90 and the first member 80 are attached to each other in the predetermined sequence along the axial direction of the input shaft 21. Assembling is made by attaching the two members along the axial line CL. Hence, the steering angle restricting device 70 that facilitates assembling is provided. Note that the second member 90 and the first member 80 can be fitted to the input shaft 21 from either end thereof.

With reference to FIG. 5A, furthermore, at least one of the first protrusion 82, the second protrusion 92, and the stoppers 61a (the housing 61) may have at least a portion which abuts the other member and which is formed integrally by an elastic body itself, or may have an elastic body which is formed separately and which is connected by bonding, etc.

This can ease a shock when each component contacts. Hence, it is preferable that the second protrusion 92 which abuts both the first protrusion 82 and the stopper 61a should be formed of an elastic body. In this case, by forming the singular member by an elastic body, shocks when the respective components contact can be eased.

Furthermore, the stopper 61a is located outwardly relative to the trajectory of the first protrusion 82 with reference to the axial center CL of the input shaft 21.

This enables the first member 80 and the stopper 61a to be placed at a position overlapping with each other with reference to the axial direction of the input shaft 21. This accomplishes the downsizing of the steering angle restricting device 70 in the axial direction.

The steering angle restricting device further includes the housing 61 which supports and holds the input shaft 21 therein, and the stopper 61a is formed integrally with the housing 61 as a structurally singular component.

Integral formation accomplishes the reduction in number of the components.

With reference to FIG. 2, furthermore, the second member 90 is located between both ends of the first base 81, and the first member 80 has respective ends of the first base 81 abutting the ball bearing 62 and the third bearing 75 (the other members 62 and 75).

That is, regarding the first member 80, at least one end of the first base 81 contacts the ball bearing 62 or the third bearing 75 (the other members 62 and 75), and by holding the ball bearing 62 together with the housing recess 61b adjacent to the ball bearing 62, and the third bearing 75 by the worm wheel 102b adjacent to the third bearing 75, the detachment of the ball bearing 62 and of the third bearing 75 is prevented.

The first member 80, the ball bearing 62, and the third bearing 75 (the other members 62 and 75) are positioned precisely relative to each other by an abutment with each other. This suppresses the detachment and backlash of the ball bearing 62 (the other member 62) and of the third bearing 75 (the other member 75) without an additional dedicated component.

Figure 6:
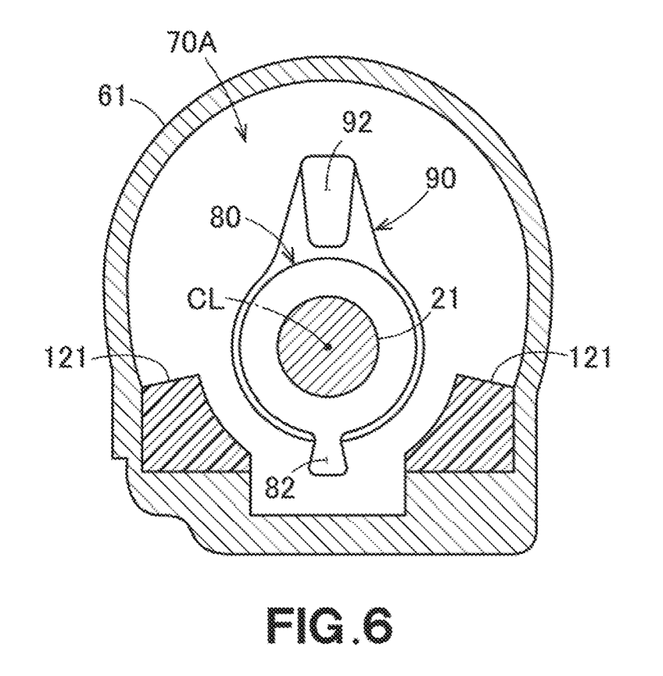
FIG. 6 is a diagram for describing a modified example of the steering angle restricting device illustrated in FIG. 2.

With reference to FIG. 6, a steering angle restricting device 70A according to a modified example is illustrated in FIG. 6. Note that the stopper 121 may be formed as a separate component from the housing 61.

Second Embodiment

Next, a second embodiment of the present disclosure will be described with reference to the figure.

Figure 7:
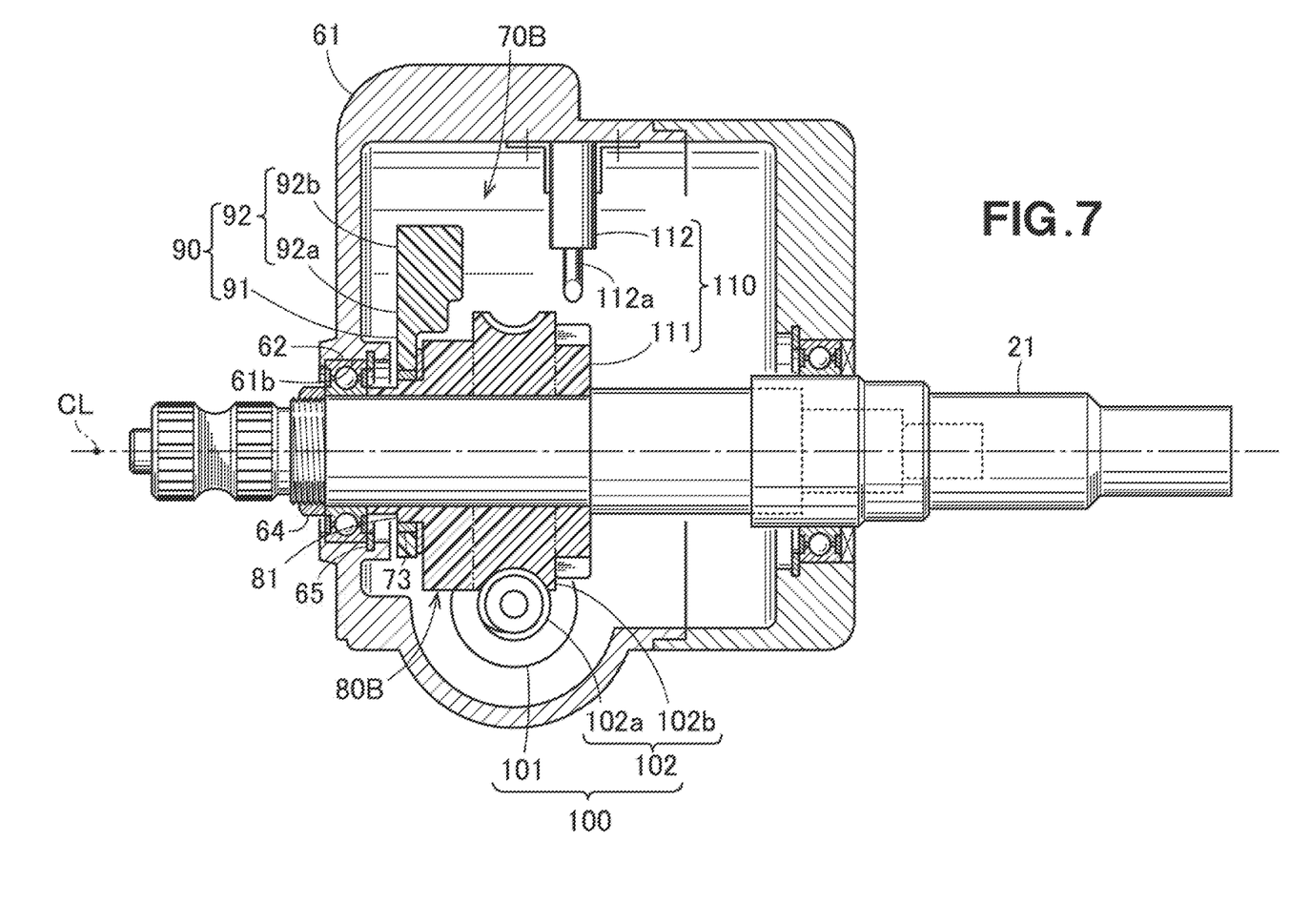
FIG. 7 is a cross-sectional view of a steering angle restricting device according to a second embodiment of the present disclosure.

With reference to FIG. 7, FIG. 7 illustrates a cross-sectional structure of a steering angle restricting device according to the second embodiment, and the illustration thereof corresponds to that of FIG. 2. According to a steering angle restricting device 70B in the second embodiment, the worm wheel 102b and the locking wheel 111 are formed integrally with the first member 80B as a structurally singular component. Other basic structures are common to those of the steering angle restricting device in the first embodiment. The common component to that of the first embodiment will be denoted by the same reference numeral, and the detailed description thereof will be omitted.

The steering angle restricting device according to the second embodiment which employs the above-described structure also accomplishes the predetermined advantageous effects of the present disclosure.

Furthermore, the steering angle restricting device 70B further includes: the reactive-force applying mechanism 100 that applies torque in the opposite direction to the rotation of the input shaft 21; and the arbitrary angle stopper 110 that stops the rotation of the input shaft 21 at an arbitrary angle.

The reactive-force applying mechanism 100 includes: the reactive-force motor 101 (the motor 101) through which a current in accordance with the torque by the input shaft 21 is caused to flow; the worm 102a provided on the motor shaft 101a of the reactive-force motor 101; and the worm wheel 102b which is meshed with the worm 102a, is provided on the input shaft 21, and rotates together with the rotation of the worm 102a.

The arbitrary angle stopper 110 includes: the locking wheel 111 that rotates together with the input shaft 21; and the stopper main body 112 which is provided so as to be forwardly or backwardly movable relative to the locking wheel 111, and is capable of contacting the locking wheel 111 by forward movement.

The worm wheel 102b and the locking wheel 111 are integrally formed with the first member 80 as a structurally singular component.

Integral formation accomplishes the reduction in number of the components.

Note that the steering angle restricting device 70B may have only the worm wheel 102b formed integrally with a first member 80B as a structurally singular component, or may have only the locking wheel 111 formed integrally with the first member 80B as a structurally singular component. The steering angle restricting device according to the second embodiment which employs the above-described structure also accomplishes the reduction in number of components.

Although the first protrusion 82 of the present disclosure has been described based on an example case in which it protrudes in the radial direction from the first base 81, the first protrusion may protrude in the axial direction along the axial line CL of the input shaft 21. Furthermore, it may protrude in the axial direction while also protruding in the radial direction. As long as it can abut the second protrusion 92 and cause the second member 90 to be rotated, the direction in which the first protrusion 82 protrudes can be selected as appropriate.

Third Embodiment

Next, a third embodiment according to the present disclosure will be described with reference to the figure.

Figure 8:
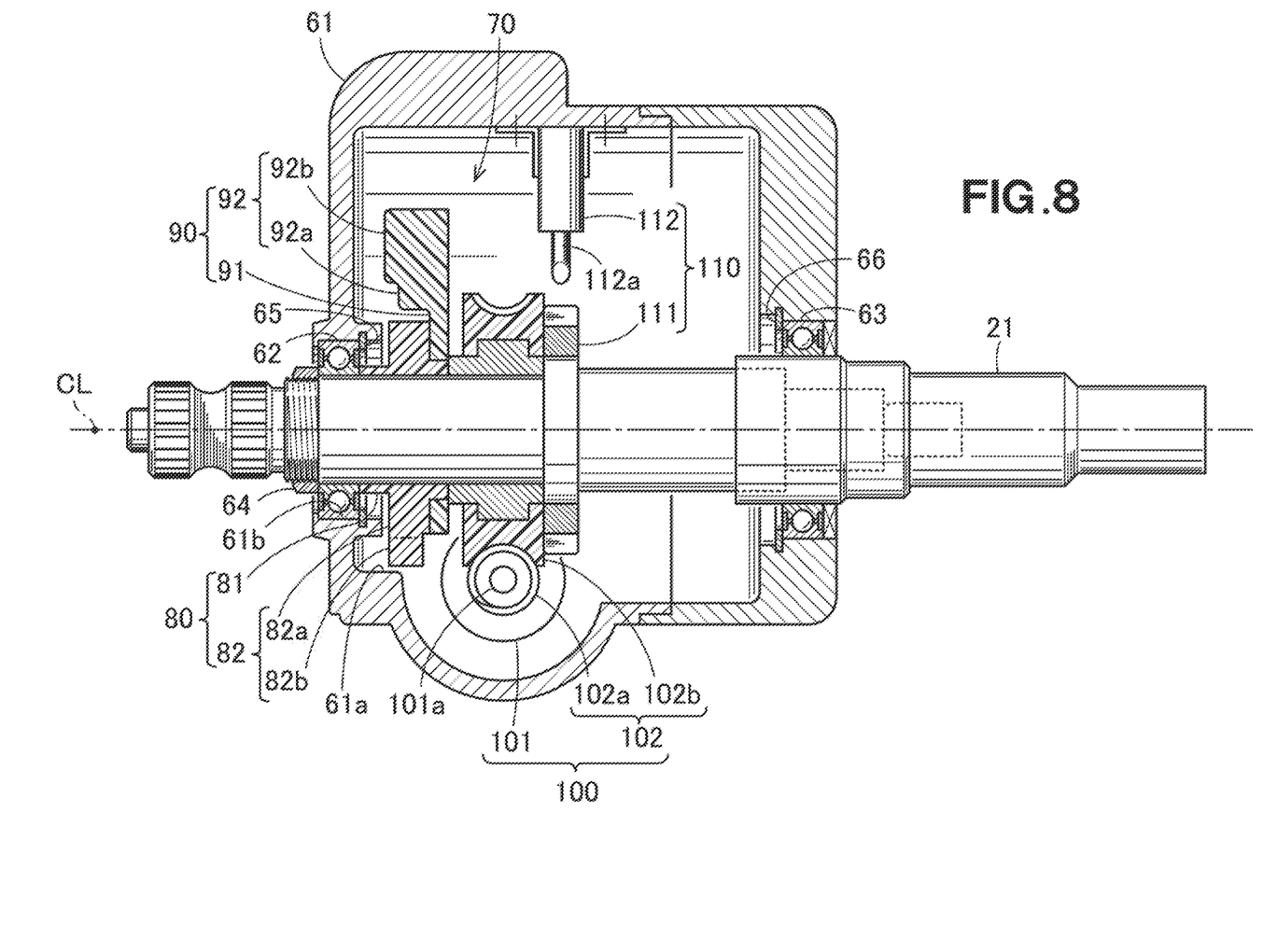
FIG. 8 is a cross-sectional view of a steering angle restricting device according to a third embodiment of the present disclosure.

With reference to FIG. 8, FIG. 8 illustrates a cross-sectional structure of a steering angle restricting device according to the third embodiment, and the illustration corresponds to that of FIG. 2. According to a steering angle restricting device 70C of the third embodiment, the first to third bearings 72, 73, and 75 (see FIG. 2) are not provided at portions abutting a second member 90C. Other basic structures are common to those of the steering angle restricting device according to the first embodiment. The common component to that of the first embodiment will be denoted by the same reference numeral, and the detailed description thereof will be omitted.

For example, surface treatment is performed on respective portions of a first member 80C and of a worm wheel 102Cb abutting the second member 90C, or a lubricant is applied thereto.

The steering angle restricting device according to the third embodiment which employs the above-described structure also accomplishes the predetermined advantageous effects of the present disclosure.

Furthermore, according to the steering angle restricting device 70C of this embodiment, the first member 80C and/or the worm wheel 102Cb directly abuts the second member 90C. A direct abutment without a bearing reduces the number of components, thereby reducing the number of necessary steps for bearing assembling. Consequently, the production costs of the steering angle restricting device can be reduced.

Note that the respective embodiments can be combined with each other. For example, the present disclosure according to the third embodiment and the present disclosure according to the first embodiment can be combined with each other. More specifically, one of the first to third bearings 72, 73 and 75 (see FIG. 2) may be adopted, and regarding the other two locations, a surface treatment or a lubrication may be applied to enable a rotatable support. Alternatively, two of the first to third bearings 72, 73 and 75 (see FIG. 2) may be adopted, and regarding the other one location, a surface treatment or a lubrication may be applied to enable a rotatable support.

The present disclosure is not limited to the above-described embodiments as long as the actions and advantageous effects of the present disclosure are accomplishable.

INDUSTRIAL APPLICABILITY

The steering angle restricting device according to the present disclosure is suitable to be built in a vehicular steering device.

REFERENCE SIGNS LIST

11 Steering wheel
21 Input shaft
61 Housing (adjoining member)
61a, 121 Stopper
62 Ball bearing (other member)
70, 70A, 70B, 70C Steering angle restricting device
75 Third bearing (other member)
80, 80B, 80C First member
81 First base
82 First protrusion
90, 90C Second member
91 Second base
92 Second protrusion
100 Reactive-force applying mechanism
101 Reactive-force motor (motor)
102a Worm
102b, 102Cb Worm wheel (adjoining member)
110 Arbitrary angle stopper
111 Locking wheel
112 Stopper main body
CL Axial center

The invention claimed is:

1. A steering angle restricting device comprising:
a first member that comprises a first base which surrounds an input shaft that is rotated when a steering wheel is turned, and which is capable of rotating together with the input shaft, and a first protrusion which protrudes in a radial direction or in an axial direction from the first base;
a second member that comprises a second base which surrounds the first base, and a second protrusion which protrudes from the second base and on a trajectory of the first protrusion, the second member being capable of rotating together with the first member only in a state in which the first protrusion is abutting the second protrusion; and
a stopper which is provided on a trajectory of the second protrusion, and which is capable of restricting the turning of the steering wheel via the input shaft when the second protrusion abuts.

2. The steering angle restricting device according to claim 1, wherein at least one of the first protrusion, the second protrusion, and the stopper comprises at least a portion abutting the other member and integrally formed of an elastic body, or an elastic body is attached to the portion.

3. The steering angle restricting device according to claim 1, wherein the stopper is located outwardly relative to the trajectory of the first protrusion with reference to an axial center of the input shaft.

4. The steering angle restricting device according to claim 1, further comprising a housing which supports and holds the input shaft therein,
wherein the stopper is formed integrally with the housing as a structurally singular component.

5. The steering angle restricting device according to claim 1,
wherein the second member is located between both ends of the first base, and
wherein the first member has at least one end of the first base contacting the other member, and by holding the other member together with the member adjacent to the other member, prevents a detachment of the other member.

6. The steering angle restricting device according to claim 1, further comprising a reactive-force applying mechanism that applies torque in an opposite direction to a rotation of the input shaft,
wherein the reactive-force applying mechanism comprises: a motor through which a current in accordance with the torque by the input shaft is caused to flow; a worm provided on a motor shaft of the motor; and a worm wheel which is meshed with the worm, is provided on the input shaft, and rotates together with a rotation of the worm, and
wherein the worm wheel is integrally, formed with the first member as a structurally singular component.

7. The steering angle restricting device according to claim 1, further comprising an arbitrary angle stopper that stops a rotation of the input shaft at an arbitrary angle,
wherein the arbitrary angle stopper comprises: a locking wheel that rotates together with the input shaft; and a stopper main body which is provided so as to be forwardly or backwardly movable relative to the locking wheel, and is capable of contacting the locking wheel by forward movement, and
wherein the locking wheel is integrally formed with the first member as a structurally singular component.

8. The steering angle restricting device according to claim 1, further comprising: a reactive-form applying mechanism that applies torque in an opposite direction to a rotation of the input shaft; and an arbitrary angle stopper that stops the rotation of the input shaft at an arbitrary angle,
wherein the reactive-force applying mechanism comprises: a motor through which a current in accordance with the torque by the input shaft is caused to flow; a worm provided on a motor shaft of the motor; and a worm wheel which is meshed with the worm, is provided on the input shaft, and rotates together with a rotation of the worm,
wherein the arbitrary angle stopper comprises: a locking wheel that rotates together with the input shaft; and a stopper main body which is provided so as to be forwardly or backwardly movable relative to the locking wheel, and is capable of contacting the locking wheel by forward movement, and
wherein the worm wheel and the locking wheel are integrally formed with the first member as a structurally singular component.

9. The steering angle restricting device according to claim 2, wherein the stopper is located outwardly relative to the trajectory of the first protrusion with reference to an axial center of the input shaft.

10. The steering angle restricting device according to claim 2, further comprising a housing which supports and holds the input shaft therein,
wherein the stopper is formed integrally with the housing as a structurally singular component.

11. The steering angle restricting device according to claim 2,
wherein the second member is located between both ends of the first base, and
wherein the first member has at least one end of the first base contacting the other member and by holding the other member together with the member adjacent to the other member, prevents a detachment of the other member.

12. The steering angle restricting device according to claim 2, further comprising a reactive-force applying mechanism that applies torque in an opposite direction to a rotation of the input shaft,
wherein the reactive-force applying, mechanism comprises: motor through which a current n accordance with the torque by the input shaft is caused to flow; a worm provided on a motor shaft of the motor; and a worm wheel which is meshed with the worm, is provided on the input shaft, and rotates together with a rotation of the worm; and
wherein the worm wheel is integrally formed with the first member as a structurally singular component.

13. The steering angle restricting device according to claim 2, further comprising an arbitrary angle stopper that stops a rotation of the input shaft at an arbitrary angle,
wherein the arbitrary angle stopper comprises: a locking wheel that rotates together with the input shaft; and a stopper main body which is provided so as to be forwardly or backwardly movable relative to the locking wheel, and is capable of contacting the locking wheel by forward movement, and
wherein the locking wheel is integrally formed with the first member as a structurally singular component.

14. The steering angle restricting device according to claim 2, further comprising: a reactive-force applying mechanism that applies torque in an opposite direction to a rotation of the input shaft; and an arbitrary angle stopper that stops the rotation of the input shaft at an arbitrary angle,
wherein the reactive-force applying mechanism comprises: a motor through which a current in accordance with the torque by the input shaft is caused to flow; a worm provided on a motor shaft of the motor; and a worm wheel which is meshed with the worm, is provided on the input shaft, and rotates together with a rotation of the worm,
wherein the arbitrary angle stopper comprises: a locking wheel that rotates together with the input shaft; and a stopper main body which is provided so as to be forwardly or backwardly movable relative to the locking wheel, and is capable of contacting the locking wheel by forward movement, and
wherein the worm wheel and the locking wheel are integrally formed with the first member as a structurally singular component.

15. The steering angle restricting device according to claim 3, further comprising a housing which supports and holds the input shaft therein,
wherein the stopper is formed integrally with the housing as a structurally singular component.

16. The steering angle restricting device according to claim 3,
wherein the second member is located between both ends of the first base, and
wherein the first member has at least one end of the first base contacting the other member, and by holding the other member together with the member adjacent to the other member, prevents a detachment of the other member.

17. The steering angle restricting device according to claim 3, further comprising a reactive-force applying mechanism that applies torque in an opposite direction to a rotation of the input shaft,
wherein the reactive-force applying mechanism comprises: a motor through which a current in accordance with the torque by the input shaft is caused to flow; a worm provided on a motor shaft of the motor; and a worm wheel which is meshed with the worm, is provided on the input shaft, and rotates together with a rotation of the worm, and
wherein the worm wheel is integrally formed with the first member as a structurally singular component.

18. The steering angle restricting device according to claim 3, further comprising an arbitrary angle stopper that stops a rotation of the input shaft at an arbitrary angle,
wherein the arbitrary angle stopper comprises: a locking wheel that rotates together with the input shaft; and a stopper main body which is provided so as to be forwardly or backwardly movable relative to the locking wheel, and is capable of contacting the locking wheel by forward movement, and
wherein the locking wheel is integrally formed with the first member as a structurally singular component.

19. The steering angle restricting device according to claim 3, further comprising: a reactive-force applying mechanism that applies torque in an opposite direction to a rotation of the input shaft; and an arbitrary angle stopper that stops the rotation of the input shaft at an arbitrary angle,
wherein the reactive-force applying mechanism comprises: a motor through which a current in accordance with the torque by the input shaft is caused to flow; a worm provided on a motor shaft of the motor; and a worm wheel which is meshed with the worm, is provided on the input shaft, and rotates together with a rotation of the worm,
wherein the arbitrary angle stopper comprises: a locking wheel that rotates together with the input shaft; and a stopper main body which is provided so as to be forwardly or backwardly movable relative to the locking wheel, and is capable of contacting the locking wheel by forward movement, and
wherein the worm wheel and the locking wheel are integrally formed with the first member as a structurally singular component.

* * * * *